United States Patent [19]  [11]  4,325,831
Watson et al.  [45]  Apr. 20, 1982

[54] FOAMABLE COMPOSITION

[75] Inventors: Stuart L. Watson, South Charleston; Paul M. Westfall, Saint Albans, both of W. Va.

[73] Assignee: Union Carbide Corporation, Danbury, Conn.

[21] Appl. No.: 243,083

[22] Filed: Mar. 12, 1981

[51] Int. Cl.$^3$ ...................... B01F 17/02; B01F 17/10; B01F 17/42
[52] U.S. Cl. .................................... 252/354; 252/307; 252/351; 252/353; 521/65; 521/74
[58] Field of Search ............... 252/354, 351, 353, 307; 521/65

[56] References Cited

U.S. PATENT DOCUMENTS

| | | | |
|---|---|---|---|
| 3,215,647 | 11/1965 | Dunn | 521/70 |
| 3,491,033 | 1/1970 | Dunn | 521/70 |
| 3,577,554 | 5/1971 | Parrish | 521/65 |
| 3,607,341 | 9/1971 | Goins et al. | 264/48 |
| 4,099,913 | 7/1978 | Walter et al. | 8/173 |
| 4,198,316 | 4/1980 | Nahta | 252/354 |

*Primary Examiner*—Morton Foelak
*Attorney, Agent, or Firm*—Francis M. Fazio

[57] ABSTRACT

A fast curing foamable composition useful for the production of fabric-like materials comprises a resin or latex formulation and a mixture of a highly ethoxylated alkylphenol, an alkali metal N-alkyl sulfosuccinamate and an alkali metal alkyl sulfate.

9 Claims, No Drawings

FOAMABLE COMPOSITION

BACKGROUND OF THE INVENTION

Fabric-like material produced with resin or latex foam compositions are well known and many are commercially available. In some instances they have a flocked surface but often they do not. A particularly suitable flocked foamed latex sheet is disclosed in U.S. Pat. No. 4,056,646, issued on Nov. 1, 1977 to P. M. Westfall and H. Mayfield, wherein is described the procedures for producing pliable, soft, foamed latex sheets of good hand and breathability having many uses. However, it has since been discovered that the procedures and compositions discussed in this patent often require a commercially unacceptable period of time for curing of the latex formulation thus detracting somewhat from commercial acceptance for many applications. The instant invention has resolved this problem to a significant extent by the selection of specific foamable mixtures added at critical concentrations to the resin or latex formulation.

Though the use of foamable compositions is known, none heretofore employed have achieved the successes herein attained. In U.S. Pat. No. 3,577,554 issued on May 4, 1971 to D. B. Parrish et al. there are described formulations of carboxyl-containing copolymer latexes reacted with an aziridine to obtain a polymer latex having both aminoester and carboxyl groups. The pH of this polymer latex is then adjusted to greater than 7, it is foamed, applied as a foam and cured to dry and form a frothed sheet. An important aspect of this process is the requirement of a basic pH value.

U.S. Pat. No. 3,491,033 issued on Jan. 20, 1970 to E. R. Dunn teaches the conversion of a foam to a solid cellular material without gelling the wet foam by use of a mixture of foaming agents and mentions that disodium N-octadecyl sulfosuccinamate can be used as a component of one of the specific mixtures.

Foam coated composites are disclosed in U.S. Pat. No. 3,607,341 issued on Sept. 21, 1971 to R. E. Goins et al., with the disclosure making reference to the use of salts of aliphatic sulfates or alkaryl sulfates among the useful foaming agents or surfactants.

Synthetic rubber foams based on styrene copolymer latexes are disclosed in U.S. Pat. No. 3,215,647 issued on Nov. 2, 1965 to E. R. Dunn. The patentee shows the separate use of ethoxylated nonylphenols and alkali metal salts of alkyl sulfates at acidic pH values. However, the composition must contain a coreactive material containing at least two substituent groups coreactive with the reactive groups on the latex in order to obtain a good foam.

R. C. Nahta in U.S. Pat. No. 4,198,316 issued on Apr. 15, 1980 discloses the use of mixtures that can contain an alkali metal salt of an alkyl sulfate as foaming agent in conjunction with at least two other components, one being a "dispersant" and the other a "stabilizer." The reference indicates the need of a basic pH value for the foamable mixture.

Nonstable foams are disclosed in U.S. Pat. No. 4,099,913 issued on July 11, 1978 to A. T. Walter, G. M. Bryant and R. L. Readshaw. These foams are produced using a variety of foaming agents, applied to a substrate, and are characterized by a short foam half-life that results in rapid breaking of the foam on contact with the substrate.

SUMMARY OF THE INVENTION

The instant invention is concerned with rapid curing foamable compositions comprising a resin or latex formulation and a mixture of a high ethoxylated alkylphenol, an alkali metal N-alkyl sulfosuccinamate and an alkali metal alkyl sulfate. The three components are added at critical concentrations based on the parts of dry resin present in the foamable composition and these concentrations are expressed as parts per hundred parts of resin (abbreviated as "phr"). The mode of preparation of the foamable mixture is of some importance in achieving maximum properties and, further, the pH of the foamable formulation in order to achieve fast cure is also important.

DESCRIPTION OF THE INVENTION

The foamable mixture, which is the most important part of this invention, is a mixture of (a) a highly ethoxylated alkylphenol of the formula:

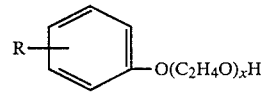

wherein R is a saturated or unsaturated, linear or branched alkyl group having from 7 to 20 carbon atoms, preferably from 8 to 12 carbon atoms and x has an average value of from 20 to 200, preferably from 40 to 100; (b) an alkali metal N-alkyl sulfosuccinamate of the formula:

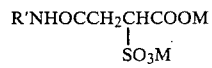

wherein R' is a saturated or unsaturated, linear or branched alkyl group having from 16 to 24 carbon atoms, preferably from 18 to 20 carbon atoms and M is hydrogen or an alkali metal atom with the proviso that at least one M group is an alkali metal atom; and (c) an alkali metal alkyl sulfate of the formula:

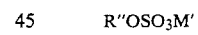

wherein R" is a saturated or unsaturated, linear or branched alkyl group having from 7 to 24 carbon atoms, preferably from 8 to 18 carbon atoms and M' is an alkali metal atom.

The concentration of ethoxylated alkylphenol present in the foamable composition is from about 2 to about 20 phr, preferably from about 2.25 to about 18.5 phr and most preferably from about 6 to about 12.5 phr. The ethoxylated alkylphenols are commercially available and known to those skilled in the art; therefore, an extensive listing thereof is not essential. Illustrative thereof one can mention the ethoxylated heptyl, octyl, 2-ethylhexyl, nonyl, decyl, isodecyl, neodecyl, dodecyl, tridecyl, hexadecyl, octadecyl, eicosyl phenols having the average number of oxyethylene groups indicated above.

The concentration of the alkali metal N-alkyl sulfosuccinamate present in the foamable composition is from about 2 to about 20 phr, preferably from about 2.25 to about 17 phr and most preferably from about 5.4 to about 14 phr. Since these compounds are well known to those skilled in the art and commercially available, an extensive listing thereof is not required. Illustrative thereof one can mention the sodium and potassium salts in which the alkyl group can be hexadecyl, heptadecyl, octadecyl, nonadecyl, eicosyl, heneicosyl, docosyl, tricosyl or tetracosyl, including the branched alkyl groups having from 16 to 24 carbon atoms; for example, disodium N-octadecyl-sulfosuccinamate.

The concentration of the alkali metal alkyl sulfate present in the foamable composition is from about 3 to about 40 phr, preferably from about 4.5 to about 32.5 phr and most preferably from about 12 to about 24 phr. These sulfates are well known to those skilled in the art and many are commercially available. Illustrative thereof one can mention the sodium and potassium salts wherein the alkyl group can be heptyl, octyl, 2-ethylhexyl, nonyl, isodecyl, decyl, undecyl, dodecyl, tetradecyl, pentadecyl, hexadecyl, octadecyl, nonadecyl, eicosyl, docosyl or tetracosyl, including the branched alkyl groups having from 7 to 24 carbon atoms; for example, sodium or potassium 2-ethylhexyl sulfate, sodium cetyl sulfate, sodium octyl sulfate, sodium oleyl sulfate, sodium lauryl sulfate.

It is to be recognized that discretion is required in the total amount of the three surfactants added to the foamable compositions and that though ranges for each of the three are recited the use of the maximum or high amounts of each in the foamable composition would tend to have a deleterious effect on the final properties of the foamed article produced.

The foamable compositions contain the foamable mixture described above with components (a), (b) and (c) in the concentrations indicated, the resin or latex formulation and other additives. The resin and latex formulations that can be used in producing the foamable compositions are any of the commercially available latex or dispersible resin compositions, and include the acrylic latexes, nitrile latexes, styrene-butadiene latexes, vinyl acetate latexes, vinyl chloride latexes, vinyl-acrylic latexes, ethylene-vinyl acetate-acrylic latexes, ethylene-vinyl chloride-vinyl acetate latexes or any other produced from a water insoluble homopolymeric or copolymeric resin. These are well known to those skilled in the art and many are commercially available.

Among the other additives that are present in the foamable composition are thickeners at a concentration of from about 1 to 5 phr, preferably about 1 to 3 phr; other anionic or nonionic surfactants at concentrations ranging from 0 to about 5 phr, preferably from about 1.5 to 4.5 phr; crosslinkers at concentrations up to about 13 phr, preferably less than 2.5 phr; fillers at concentrations up to about 50 phr; pigments and colorants to achieve the desired tinctorial effect; bactericides or fungicides or plasticizers if desired. The use of such materials is known in the art and requires no further elaboration beyond that indicated since the skilled individuals know the amount of each conventionally used and the types of each available.

The foamable composition is foamed using equipment readily available for foaming compositions. This is accomplished by beating air into the composition, or some other gas, until a fine, uniform cell structure foam is obtained having the desired foam cell size and body. The volume of the foamable composition is increased to from about 3 to 20 times its original volume, preferably from 6 to 10 times its original volume. The foamable composition may contain fillers and colorants if desired. It has been noted that when these are to be employed overall better results are often achieved if they are given a grinding treatment with water and a portion of the alkali metal N-alkyl sulfosuccinamates before adding to other components used in the foamable composition. Thus, the procedure generally followed involves grinding the pigments and fillers with water and dispersant, adding the remainder of the formulation ingredients to the grind and thoroughly mixing until uniform. The foamable composition is then foamed and applied to the substrate by any conventional means, for example, a knife coater. After application of the foam to the substrate, flocking material can be applied to the surface, if desired, and the composite is dried and cured at an ambient to elevated temperature. The dry composite can also be passed through crushing rolls if desired, and heated to complete curing. Crushing often improves durability of the foamed fabric, but it is not essential; for example, in hospital fabrics that are used once and discarded durability is not as important a factor as it is in drapery fabrics.

The foamable compositions of this invention containing the foaming mixture defined have low pH values; that is the pH of the foamable composition is acidic. It was completely unexpected to find that these acidic compositions were capable of producing stable wet foams at the low pH values and that the foams cured at an unexpectedly fast rate to produce a dry cellular product; much faster than the cure rates heretofore noted when using compositions having pH values above 7. Thus, it was found that our foam compositions generally dried in less than 5 minutes at about 100° C. to 125° C., often in less than 2 minutes at about 107° C., and cured in less than 5 minutes at temperatures of from about 135° C. to about 160° C. in the laboratory experiments. As substrate one can use any of the woven or non-woven materials available produced from natural or synthetic fibers or blends; also suitable are paper, leather, wood, metal, plastic, glass or rubber substrates.

Several tests were utilized to evaluate each fabric, and these tests are detailed below.

TENSILE STRENGTH

A standard Instron Tensile Tester ® was employed for dry and wet strength measurements. Samples were die-cut to 1 inch by 3.5 inches then held with 1 inch width jaws. A 2 inch gauge length was used and the crosshead speed was 1 inch per minute. Five samples were tested in the cross direction for each fabric for both dry and wet measurements. The wet strength measurements were accomplished after soaking for four minutes in an aqueous solution containing 1 percent of the dioctyl ester of sodium sulfosuccinic acid. The samples exhibited typical nonwoven stress-strain curves with a fairly high initial modulul leveling off to an irregular plateau then falling to low values at higher elongation. The approximate average of the plateau region was taken as the tensile strength.

ABRASION RESISTANCE

Two methods were employed to determine the abrasion resistance of the fabrics. The first was the Taber Abraser ® and utilized CS-10 wheels with a 250 g weight. The samples were die-cut to 4 inch by 4 inch then mounted on specimen cards. The samples were weighed initially and after 10 cycles to give an estimate of the initial abrasion. Some samples showed an increase in weight after the initial 10 cycles. These values were reported as negative weight loss, and these occurrences were attributed to imbedding of portions of the abrasive in the fabric as evidenced by green discoloration. Failure was seen as delamination of a section of foam with remaining flock from the substrate. If failure did not occur, the test was terminated at 1000 cycles.

The second method utilized for determining abrasion resistance was the Crockmeter ® (Test Fabrics Inc.), an instrument traditionally used for color fastness determination. Fabric samples were die-cut to 2.75 inch by 6 inch then weighed and mounted. The test basically consists of rubbing a cloth under a given weight back and forth across the test fabric. The test was terminated at 1000 cycles or at failure which consisted of delamination of a section of foam with the attendant flock from the substrate. After failure or 1000 cycles, the fabric sample was reweighed to determine the weight loss, and the percentage value was transformed to give the loss for the actual sample area tested. Finally, some samples exhibited rolling or pilling prior to failure, and this occurrence was also recorded.

Some points of interest about the abrasion tests should be noted. First, the correlations between the Taber results and the Crockmeter results were not statistically strong, leading to the supposition that the goodness of abrasion resistance is dependent on the method of measurement. Second, the mode of failure for both tests is delamination of the foam from the substrate which is quite different from the normal concept of surface abrasion. Thus, the best fabrics should be those requiring many cycles to failure and a small weight loss representing flock and possibly upper layers of foam.

WASH RESISTANCE

Standard home laundry washer and dryer were utilized. Fabric samples were cut to 8 inch by 10 inch and washed using AATCC Standard Detergent #124 with two laboratory coats for ballast. A hot water wash followed by a warm rinse and then a 50 minute standard dry cycle were employed. Fabrics failed only after washing, not after drying, and failure occurred by flaking of the foams structure off of the substrate.

STIFFNESS

The ASTM D 1388-55T method for evaluating the stiffness of the fabrics was employed.

POROSITY

Measurement of fabric porosity involved the determination of air flow through the fabric under a small pressure differential (0.5 inch water pressure drop) and reportedly relates to the breathability of the fabric. Fabric samples were die-cut to 4 inch by 4 inch then mounted to expose a test area of approximately 4.2 square inches and the air flow determined.

WRINKLE RESISTANCE

After completion of the wash resistance tests, the samples were rated independently by three observers against the Monsanto Three Dimensional Wash-N-Wear Standards. The values were averaged and recorded. Samples destroyed in the wash resistance tests were assigned a zero value. In this test higher values indicate fewer wrinkles.

The following examples further serve to illustrate the invention.

EXAMPLE 1

A series of foamable formulations was prepared to illustrate the importance of having all three components in the foamable mixture at the recited concentrations. Runs A and B are illustrative of this invention; Runs C, D and E contain one of the components in the foamable mixture at a concentration outside the range found desirable; in Run F all of the components in the foamable mixture are present at concentrations outside the desired range.

| Run | A | B | C | D | E | F |
|---|---|---|---|---|---|---|
| Hydroxyethyl cellulose, phr | 2.71 | 2.35 | 2.32 | 2.33 | 2.44 | 2.08 |
| Filler, clay, phr | 45.24 | 39.26 | 38.76 | 38.85 | 40.79 | 34.68 |
| Pigment, $TiO_2$, phr | 30.16 | 26.17 | 25.84 | 25.90 | 27.19 | 23.12 |
| Surfactant A, phr* | 13.20 | 6.54 | 1.61 | 11.34 | 11.90 | 1.45 |
| Surfactant B, phr* | 6.60 | 3.27 | 5.66 | 0.81 | 3.40 | 0.72 |
| Surfactant C, phr* | 9.43 | 4.67 | 8.08 | 1.16 | 1.22 | 1.04 |
| Lecithin, phr | 8.08 | 4.67 | 2.31 | 4.63 | 7.28 | 2.06 |
| Latex polymer, 100 parts dry | (a) | (b) | (b) | (c) | (d) | (e) |
| pH | 3.5 | 3.5 | 4.5 | 4.5 | 4.5 | 3.5 |
| Total solids, % | 40 | 40 | 40 | 40 | 40 | 40 |
| Brookfield LVT viscosity, cps | 240 | 1112 | 2850 | 470 | 487 | 3000 |

*Surfactant A-ethoxylated nonylphenol having an average of 100 ethyleneoxy groups.
Surfactant B-disodium N-octadecyl sulfosuccinamate.
Surfactant C sodium hexadecyl sulfate.
(a)-A 39.5 vinyl acetate/55.5 n-butyl acrylate/4 N-methylol acrylamide/1 methacrylic acid copolymer latex having a total solids content of 48.8 weight percent and a pH of 4.4
(b)-A 5.8 methyl methacrylate/79.2 ethyl acrylate/10 2-ethylhexyl acrylate/4 N-methylol acrylamide/1 methacrylic acid copolymer latex having a total solids content of 49.6 weight percent and a pH of 4.4
(c)-A 17 acrylonitrile/78 n-butyl acrylate/4 N-methylol acrylamide/1 methacrylic acid copolymer latex having a total solids content of 49.5 weight percent and a pH of 4.4
(d)-A 3 methyl methacrylate/92 ethyl acrylate/4 N-methylol acrylamide/1 methacrylic acid copolymer latex having a total solids content of 49.4 weight percent and a pH of 4.1
(e)-A 3.2 styrene/91.8 ethyl acrylate/4 N-methylol acrylamide/1 methacrylic acid copolymer latex having a total solids content of 49.2 weight percent and a pH of 4.5
Note: phr values are on dry, active basis based per 100 parts of dry polymer in the latex formulation.

The pH of each was adjusted to the value indicated with a 10% aqueous oxalic acid solution and then each of the above formulations was separately foamed to a foam density of about 0.25 g/cc in a laboratory mixer. The foam was normalized, large bubbles of air stirred out of the mixture, by a final slow stirring.

On a Teflon ® sheet there was placed a polyester fabric (1.5 ounces per square yard), stretched to remove all wrinkles, and a 30 mil coating of the froth was applied to the surface of the fabric. The surface of the froth latex foam formulation was immediately sprayed with ground cotton linters and then dried for 2 minutes at about 127° C., crushed between two rubber rollers at a pressure of 50 psi, and finally cured at about 150° C. for 3 minutes. A solid foam resulted. The foam fabrics produced had the following properties:

| Run Fabric | A | B | C | D | E | F |
|---|---|---|---|---|---|---|
| Dry strength, pli | 2.23 | 2.24 | 2.59 | 2.86 | 2.78 | 3.18 |
| Wet strength, pli | 1.20 | 1.39 | 1.55 | 1.64 | 1.60 | 2.19 |
| Taber, cycles at failure | 40 | 30 | 16 | 168 | 142 | 198 |
| Crockmeter, cycles at failure | 1000 | 177 | 1000 | 1000 | 1000 | 440 |
| Wash resistance, cycles at failure | 1 | 1 | 1 | 5 | 1 | 3 |
| Stiffness, mg (cm × $10^{-6}$) | 2.75 | 2.93 | 3.38 | 2.06 | 5.46 | 5.24 |
| Porosity, cu ft air/ sq ft/min | 19.8 | 19.8 | 19.7 | 21.8 | 19.8 | 19.4 |

| Run Fabric | A | B | C | D | E | F |
|---|---|---|---|---|---|---|
| Wrinkle resistance | — | 5 | 4.7 | 5 | 5 | 4 |

Foam fabrics produced in similar manner omitting flocking show similar results.

EXAMPLE 2

A formulation was prepared containing 2.5 phr hydroxyethyl cellulose, 41.8 phr of clay filler, 27.87 phr of titanium dioxide, 12.2 phr of Surfactant A, 3.48 phr of Surfactant B, 8.72 phr of Surfactant C, 2 phr of lecithin and 100 phr, dry basis, of the latex polymer identified in footnote (e) of Example 1. Surfactants A, B and C are also identified in the footnotes of Example 1. The foamable composition was adjusted to a pH of 4 as indicated in Example 1; it had a total solids content of 40 weight percent and a Brookfield LVT viscosity of 460.

The foamable formulation was foamed, applied to polyester fabric and cured as described in Example 1. The foam fabric properties are shown in Table I.

EXAMPLE 3

Two foamable formulations were prepared using two different latex compositions but differing mainly in the concentrations of filler and pigment added, using the concentrations of components indicated below:

| Run | A | B |
|---|---|---|
| Hydroxyethyl cellulose, phr | 1.01 | 1.03 |
| Filler, clay, phr | 16.87 | 51.70 |
| Pigment, TiO$_2$, phr | 8.31 | 25.46 |
| Surfactant A, phr* | 7.05 | 7.20 |
| Surfactant B, phr* | 3.52 | 3.60 |
| Surfactant C, phr* | 5.04 | 5.14 |
| Lecithin | 3.52 | 3.60 |
| Latex polymer, 100 parts dry | (f) | (g) |
| pH | 3.5 | 3.5 |
| Total solids, % | 35 | 45 |
| Brookfield LVT viscosity, cps | 140 | 430 |

*See footnoted Example 1
(f)-A 15 styrene/80 ethyl acrylate/4 N-methylol acrylamide/1 methacrylic acid copolymer latex having a total solids content of 49.7 weight percent and a pH of 4.3
(g)-A 12 acrylonitrile/83 ethyl acrylate/4 N-methylol acrylamide/1 methacrylic acid copolymer latex having a total solids content of 48.6 weight percent and a pH of 4.5

Each foamable formulation was adjusted to the pH indicated, foamed and applied to polyester fabric as described in Example 1, dried at about 113° C. for 3 minutes, crushed and cured at about 149° C. for 3 minutes. The foam fabrics produced were evaluated with the results shown in Table I.

EXAMPLE 4

The beneficial effect of initially grinding the filler and pigment is illustrated by this example. In both runs the foamable formulations used are within the scope of the invention; however, in Run A, which included the grinding step, the overall properties of the finished foam fabric were better.

The finished foamable formulations contained the following components:

| | |
|---|---|
| Hydroxyethyl cellulose, phr | 2.05 |
| Filler, clay, phr | 34.17 |
| Pigment, TiO$_2$, phr | 22.78 |
| Surfactant A, phr* | 5.69 |
| Surfactant B, phr* | 2.85 |
| Surfactant C, phr* | 4.07 |
| Lecithin, phr | 0.77 |
| Latex polymer, 100 parts dry | (h) |
| Crosslinker, phr** | 5.75 |
| Surfactant D, phr*** | 1.16 |
| Total solids, % | 45 |
| pH (adjusted as in Ex. 1) | 3.5 |

*See footnotes Example 1
**Tetramethylol glycoluril
***Nonylphenol polyethylene glycol ether having an average of 4 ethyleneoxy units
(h) A 71.8 ethyl acrylate/20 n-butyl acrylate/4 acrylonitrile/2 N-methylol acrylamide/2.2 methacrylic acid copolymer latex having a total solids content of 55 weight percent In Run A the pigment and filler were given a preliminary grind by mixing together the following components:

| | |
|---|---|
| Clay filler | 441 parts by weight |
| Titanium dioxide | 294 parts by weight |
| Surfactant A (70%) | 7 parts by weight |
| Lecithin | 10 parts by weight |
| Surfactant D | 15 parts by weight |
| Water | 409.8 parts by weight |

The mixture was ground for 20 minutes and a portion thereof was used to produce the foamable formulation.

In Run B all of the components were mixed together as described in the previous examples without grinding.

The two foamable compositions were foamed, applied and cured as described in Example 1. The foam fabrics produced were evaluated and the results are shown in Table I.

EXAMPLE 5

A foamable formulation was prepared in which the pigment and filler underwent a preliminary grind treatment with a portion of the disodium N-octadecyl sulfosuccinamate and water before the other components were added; parts are by weight.

The grind was produced by adding 39 parts of clay filler, 26 parts of titanium dioxide and 2.19 phr (3 parts of 35% solution) of disodium N-octadecyl sulfosuccinamate to 32 parts of water and grinding for 20 minutes.

A second mixture was prepared containing 87 parts of the same latex copolymer described in Example 4, 3.16 phr (4.3 parts of 35% solution) of disodium N-octadecyl sulfosuccinamate, 4.24 phr (2.9 parts of 70% solution) of the same ethoxylated nonylphenol used in Example 1, and 3.03 phr (5.8 parts of 25% solution) of sodium hexadecyl sulfate. This mixture had a pH of 5.2.

The final foamable formulation was prepared by adding 65 parts of the second mixture, 8 parts of a 12% solution of hydroxyethyl cellulose to 14 parts of the grind and mixing until uniform. The pH was adjusted to 3.5 with a dilute (10%) oxalic acid solution, and then 2 parts of tetramethylol glycoluril and sufficient water that the entire formulation contained a total of 100 parts by weight were added.

The foamable composition was foamed, applied and cured as described in Example 1. Results are reported in Table I.

The following table summarizes the properties of the foam fabrics produced in Examples 2 to 5 inclusive.

TABLE I

| Example | 2 | 3 | | 4 | | 5 |
|---|---|---|---|---|---|---|
| Run | | A | B | A | B | |
| Dry strength, pli | 2.06 | 3.26 | 2.96 | 4.12 | 4.8 | — |

TABLE I-continued

| Example | 3 | | | 4 | | 5 |
|---|---|---|---|---|---|---|
| Run | 2 | A | B | A | B | 5 |
| Wet strength, pli | 1.03 | 1.96 | 2.09 | 2.71 | 2.68 | — |
| Taber, cycles at failure | 10 | 1000 | 1000 | 1000 | 41 | 1500 |
| Crockmeter, cycles at failure | 1000 | 1000 | 1000 | 273 | 79 | — |
| Wash resistance, cycles at failure | 1 | 1 | 1 | 5 | 5 | 5 |
| Stiffness, mg (cm $\times$ 10$^{-6}$) | 1.89 | 2.41 | 3.26 | 4.85 | 3.44 | — |
| Porosity, cu ft air/sq ft/min | 19.4 | 20.2 | 19.7 | 19 | 18.3 | — |
| Wrinkle resistance | 4.2 | 5.0 | 4.5 | 4.8 | 4.9 | — |

What is claimed is:

1. A foamable mixture comprising:
   (a) 2 to 20 parts of a highly ethoxylated alkylphenol of the formula:

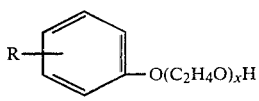

wherein R is a saturated or unsaturated, linear or branched alkyl having from 7 to 20 carbon atoms and x has an average value of from 20 to 200;
   (b) 2 to 20 parts of an alkali metal N-alkyl sulfosuccinamate of the formula:

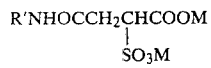

wherein R' is a saturated or unsaturated, linear or branched alkyl having from 16 to 24 carbon atoms and M is hydrogen or an alkali metal atom with the proviso that at least one M group is an alkali metal atom; and
   (c) 3 to 40 parts of an alkali metal alkyl sulfate of the formula:

$$R''OSO_3M$$

wherein R'' is a saturated or unsaturated, linear or branched alkyl having from 7 to 24 carbon atoms and M' is an alkali metal atom.

2. A foamable mixture as claimed in claim 1, wherein:
   (i) component (a) is present at a concentration of from 2.25 to 18.5 phr;
   (ii) component (b) is present at a concentration of from 2.25 to 17 phr; and
   (iii) component (c) is present at a concentration of from 4.5 to 32.5 phr.

3. A foamable mixture as claimed in claim 1, wherein
   (i) component (a) is present at a concentration of from 6 to 12.5 phr;
   (ii) component (b) is present at a concentration of from 5.4 to 14 phr; and
   (iii) component (c) is present at a concentration of from 12 to 24 phr.

4. A foamable mixture as claimed in claim 1, wherein R is a linear alkyl group having from 8 to 12 carbon atoms; R' is a linear alkyl group having from 18 to 20 carbon atoms; and R'' is a linear alkyl group havig from 8 to 15 carbon atoms.

5. A foamable mixture as claimed in claim 1, wherein x has an average value of from 40 to 100 and M is sodium or potassium.

6. A foamable mixture as claimed in claim 1, wherein component (a) is ethoxylated nonylphenol in which x has an average value of from 40 to 100.

7. A foamable mixture as claimed in claim 1, wherein component (b) is disodium N-octadecyl sulfosuccinamate.

8. A foamable mixture as claimed in claim 1, wherein component (c) is sodium hexadecyl sulfate.

9. A foamable mixture as claimed in claim 1 comprising ethoxylated nonylphenol in which x has an average value of 40; disodium N-octadecyl sulfosuccinamate; and sodium hexadecyl sulfate.

* * * * *